United States Patent
Jeon

(10) Patent No.: US 7,559,342 B2
(45) Date of Patent: Jul. 14, 2009

(54) FLEXIBLE HOSE AND VACUUM CLEANER HAVING THE SAME

(75) Inventor: Kyong-hui Jeon, Seosan-si (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 0 days.

(21) Appl. No.: 12/000,228

(22) Filed: Dec. 11, 2007

(65) Prior Publication Data
US 2008/0295276 A1    Dec. 4, 2008

(30) Foreign Application Priority Data
May 31, 2007    (KR)    ................ 10-2007-0053249

(51) Int. Cl.
*F16L 11/00*    (2006.01)
(52) U.S. Cl. .................... 138/121; 138/118
(58) Field of Classification Search ............... 138/118, 138/121, 122, 173; 15/339, 327.7
See application file for complete search history.

(56) References Cited

U.S. PATENT DOCUMENTS

| | | | | |
|---|---|---|---|---|
| 4,062,380 A | * | 12/1977 | Hofle | ................ 138/122 |
| 4,340,089 A | * | 7/1982 | Freiherr von Arnim et al. | ................ 138/121 |
| 4,342,131 A | * | 8/1982 | Reid | ................ 15/327.6 |
| 4,601,082 A | * | 7/1986 | Kurz | ................ 15/319 |
| 4,756,045 A | * | 7/1988 | Gans et al. | ................ 15/300.1 |
| 6,024,132 A | * | 2/2000 | Fujimoto | ................ 138/122 |

FOREIGN PATENT DOCUMENTS

| | | |
|---|---|---|
| DE | 139164 | 5/1901 |
| KR | 20-0431136 | 11/2006 |

* cited by examiner

*Primary Examiner*—Patrick F Brinson
(74) *Attorney, Agent, or Firm*—Blank Rome LLP

(57) ABSTRACT

A flexible hose includes a hose body and a plurality of pleats formed on an outer circumferential surface of the hose body by predetermined intervals to give flexibility to the flexible hose. Each of the plurality of pleats includes an entering portion formed to be inclined to the outer circumferential surface of the hose body, and a head portion formed vertical to the outer circumferential surface of the hose body to extend from the entering portion, to be in fluid communication with an inside of the hose body via the entering portion.

21 Claims, 7 Drawing Sheets

FLEXIBLE HOSE AND VACUUM CLEANER HAVING THE SAME

CROSS-REFERENCE TO RELATED APPLICATIONS

This application claims the benefit of Korean Patent Application No. 2007-53249, filed May 31, 2007 in the Korean Intellectual Property Office, the disclosure of which is incorporated herein by reference in its entirety. Also, this application may be related to the copending U.S. patent application Ser. No. 10/777,751, filed Feb. 14, 2004 entitled "Vacuum Cleaner Accessories" by Tak-soo Kim, the entire disclosure of which is incorporated herein by reference.

FIELD OF THE INVENTION

The present invention relates to a flexible hose capable of being used in a vacuum cleaner and a vacuum cleaner having the same.

BACKGROUND OF INVENTION

In general, a flexible hose is a hose that can be expanded and contracted within a predetermined range, and can be bent freely. Conventional flexible hoses have a plurality of pleats that project from an outer circumferential surface thereof so that the flexible hose can be expanded and contracted in a lengthwise direction thereof. Such hoses are often used in vacuum cleaners to connect a suction nozzle with a cleaner body.

FIG. 1 illustrates a partial sectional view of a prior art flexible hose 1. As seen in FIG. 1, the prior art flexible hose 1 has a plurality of pleats 13 formed on the outer circumferential surface of the hose body 11. Each of the pleats 13 is formed in a U shape. Both sides of the pleat 13 are formed to be substantially vertical with respect to the outer circumferential surface of the hose body 11. An inner space 13a of the pleat 13 is in fluid communication with the inside of the hose body 11. The plurality of pleats 13 allow the flexible hose 1 to be expanded and contracted within a predetermined range of sizes.

As illustrated in FIG. 1, when air flows inside of the flexible hose 1 (arrow A), some air enters the inner spaces 13a of the plurality of pleats 13 (arrow B). When air enters the inner spaces 13a of the plurality of pleats 13, noise is increased.

FIG. 2 illustrates a second prior art flexible hose 2. As seen in FIG. 2, the flexible hose 2 includes a hard steel wire 21 and a hose body 23. The hard steel wire 21 is formed in a helical shape, such as a coil spring, and the hose body 23 is formed of a composite resin film to cover the hard steel wire 21. Fold portions 25 are formed between pitches of the hard steel wire 21 on the hose body 23. The hard steel wire 21 and fold portions 25 allow the flexible hose 2 to be expanded and contracted in a lengthwise direction thereof.

When the flexible hose 2 is contracted, pleat spaces 27 are formed in a U shape between the fold portions 25 and the hard steel wire 21 positions in the pleat spaces 27. Therefore, when air flows inside the flexible hose 2, some air flows into the pleat spaces 27, which increases noise. Additionally, the flexible hose 2 of FIG. 2 creates another problem in that the hard steel wire 21 adds significant weight to the hose 2.

SUMMARY OF THE INVENTION

Accordingly, an aspect of the present invention is to provide a flexible hose that can reduce noise generated by air flowing inside thereof, to enhance the flexibility of the flexible hose, and to provide a vacuum cleaner having a flexible hose of the same characteristics.

In one embodiment, the above aspects and/or other features of the present invention are achieved by providing a flexible hose, which includes a hose body having an inner passageway and an outer circumferential surface and a plurality of pleats formed on the outer circumferential surface of the hose body in predetermined intervals and adapted to give flexibility to and reduce noise within the flexible hose. At least one of the plurality of pleats may include an entering portion inclined with respect to the outer circumferential surface of the hose body, the entering portion being in fluid communication with the inner passageway of the hose body via the entering portion when in an open position, and the open portion being in an open position when the hose body is expanded lengthwise and in a closed position when the hose body is compressed lengthwise. A pair of sidewalls extend substantially vertical to the outer circumferential surface of the hose body and a head portion formed between the pair of sidewalls, the head portion being in fluid communication with the inner passageway of the hose body via the entering portion when the entering portion is in the open position and the head portion not being in fluid communication with the inner passageway of the hose body when the entering portion is in the closed position. Preventing fluid communication between the inner passageway and the head portions of the plurality of pleats in this way reduces noise caused by fluid flowing within the flexible hose.

A sidewall of each of the plurality of pleats may be bent toward the inside of the pleat. Accordingly, the entering portions of the plurality of pleats can be opened or stretched significantly more than the pleats of conventional flexible hoses, thereby making the flexible hose more flexible.

Each of the plurality of pleats may be a separate ring around the circumferential surface of the hose body. Alternatively, the plurality of pleats may be at least one pleat continuously connected across the length of the outer circumferential surface of the hose body in a substantially helical shape.

According to another embodiment of the present invention, at least one of the plurality of pleats in the first embodiment may comprise a pair of sidewalls extending substantially vertical to the outer circumferential surface of the hose body and an inner space formed between the pair of sidewalls, a first protrusion formed on one of the sidewalls, extending substantially parallel to the outer circumferential surface of the hose body, and a second protrusion formed on the opposite sidewall. The second protrusion is configured to be in sliding contact with the first protrusion such that when the first protrusion and second protrusion are in sliding contact the inner space of the pleat is not in fluid communication with the inner passageway. Preventing fluid communication between the inner passageway and the inner space of the plurality of pleats in this way reduces noise caused by air flowing within the flexible hose. This embodiment may also include at least two pleats that have different cross-sectional shapes from each other.

According to yet another embodiment of the present invention, a vacuum cleaner may include a cleaner body connected to a flexible hose of one of the above embodiments. The cleaner body suctions air towards the cleaner body and the flexible hose may be formed so that the entering portion of each of the plurality of pleats is inclined opposite to the direction air is suctioned into the cleaner body.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

The above aspects and other aspects and/or advantages of the invention will be more apparent and more readily appreciated from the following description of the embodiments, taken in conjunction with the accompanying drawings in which like reference numerals refer to like parts, components and structures.

DETAILED DESCRIPTION OF THE EXEMPLARY EMBODIMENTS

Hereinafter, certain exemplary embodiments of the present invention will be described in detail with reference to the accompanying drawings.

The matters defined in the description, such as a detailed construction and elements thereof, are provided only to assist in a comprehensive understanding of the invention. Thus, it is apparent that the present invention may be carried out without such defined matters. Also, well-known functions or constructions are not described in detail to provide a clear and concise description of exemplary embodiments of the present invention.

Figure 3:
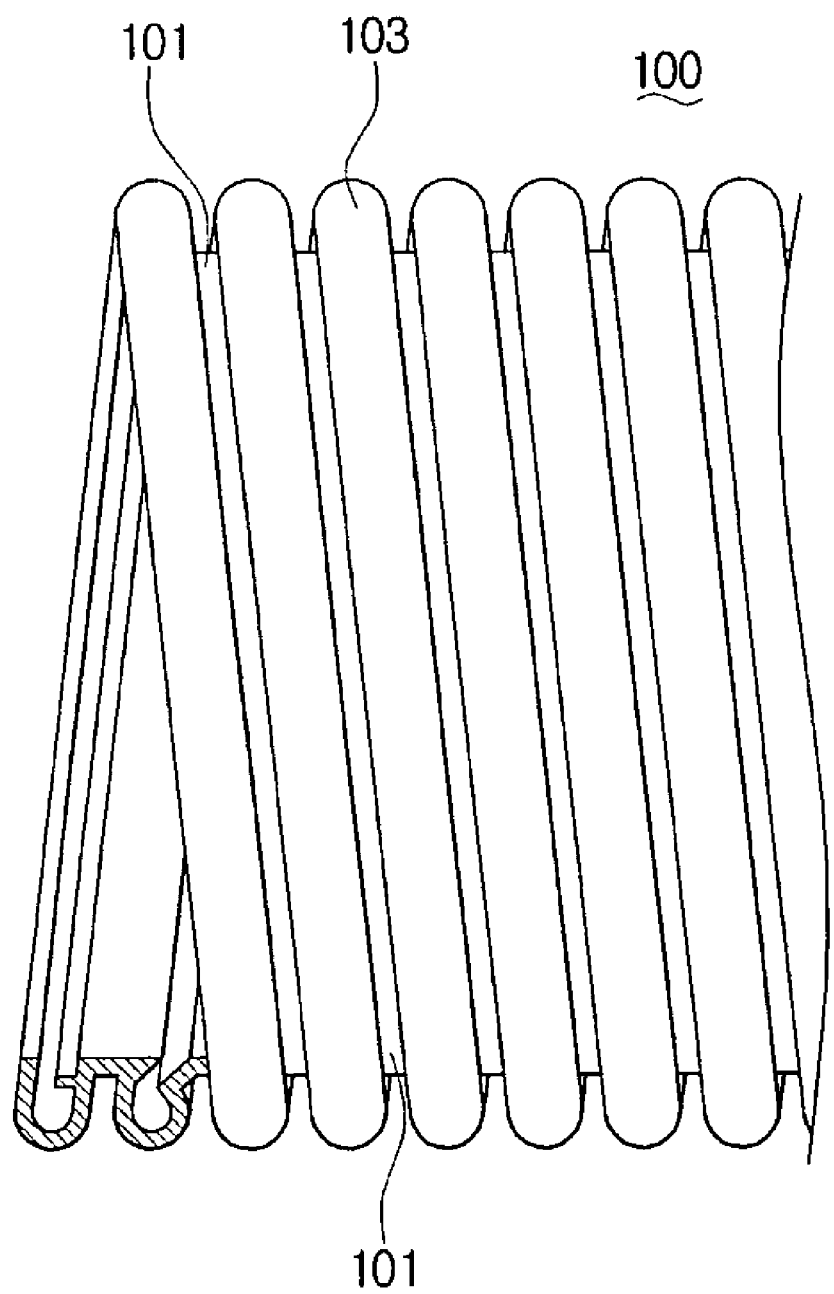
FIG. 3 is a partial side elevational view illustrating a flexible hose according to an embodiment of the present invention.
Figure 8:
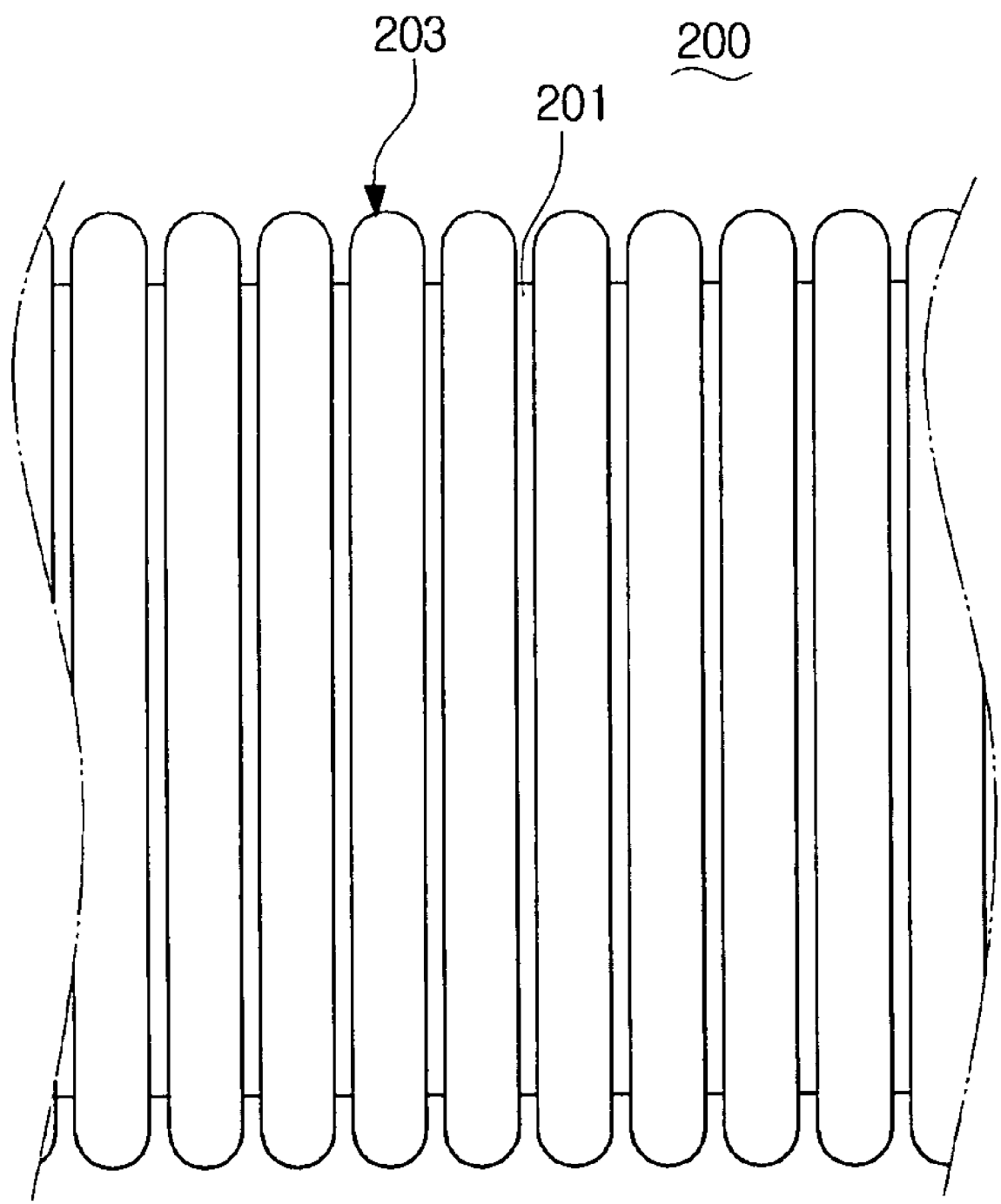
FIG. 8 is a partial side elevation view illustrating a flexible hose according to another embodiment of the present invention.

FIG. 3 is a partial elevation view illustrating a flexible hose 100 according to an embodiment of the present invention, and FIG. 8 is a partial elevation view illustrating the flexible hose 200 according to another embodiment of the present invention.

Figure 4:
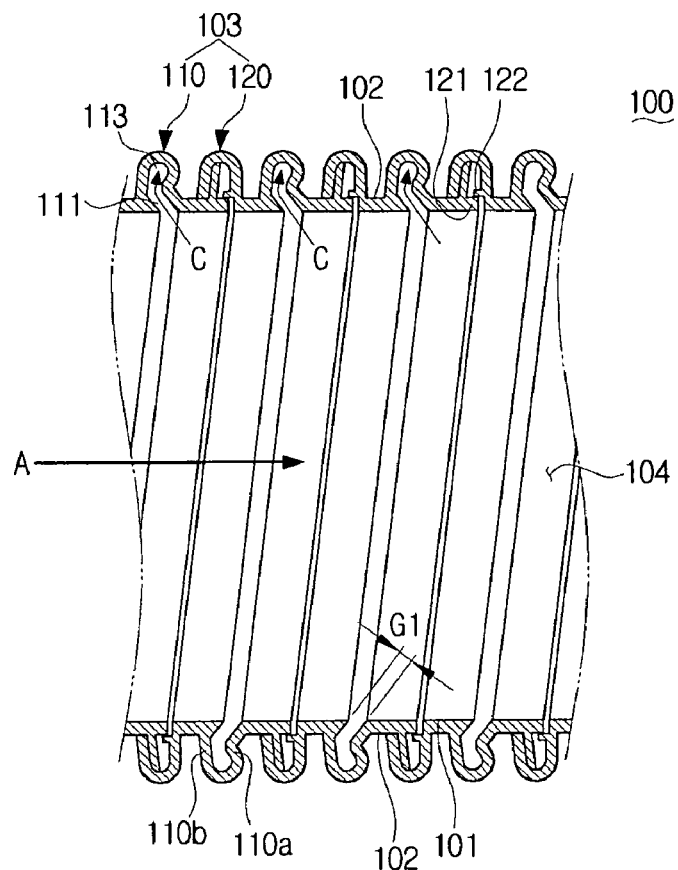
FIG. 4 is a partial longitudinal view in section of the flexible hose illustrated in FIG. 3.

Referring to FIGS. 3 and 4, a flexible hose 100 according to an embodiment of the present invention includes a hose body 101 and a plurality of pleats 103. The hose body 101 forms an inner passage 104 through which a fluid, such as air, flows and the inner passage 104 has an approximately circular cross-section.

The plurality of pleats 103 gives the flexible hose 100 flexibility and projects from the outer circumferential surface 102 of the hose body 101 in predetermined intervals. The plurality of pleats 103 allows the flexible hose 100 to be expanded and contracted within a predetermined range in a lengthwise direction of the flexible hose 101.

The plurality of pleats 103 may have first pleats 110 and second pleats 120. Sections of the first pleat 110 and the second pleat 120 may have a different shape from each other, as illustrated in FIG. 4. The first pleats 110 and the second pleats 120 are formed in repetition across the length of the hose body 101 by alternating between first pleats 110 and second pleats 120 at every pitch.

Figure 5:
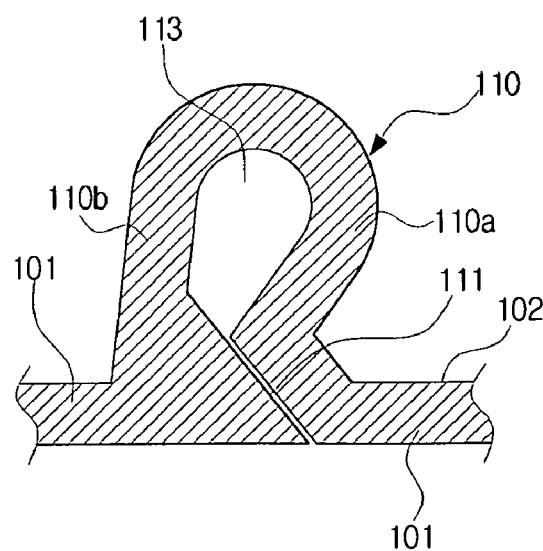
FIG. 5 is a partial sectional view illustrating a first pleat of the flexible hose illustrated in FIG. 4, showing the flexible hose compressed in a lengthwise direction.

Referring to FIG. 5, each of the first pleats 110 may be formed so that one sidewall 110a thereof is bent toward an opposite sidewall 110b thereof. More specifically, each first pleat 110 may be formed with one sidewall 110a thereof bent inward, thereby having a cross-section formed substantially in the shape of the letter "R" because the first pleats 110 have a substantially R-shaped cross-section, when the flexible hose 100 is expanded, both sidewalls 110a and 110b of the first pleat 110 can be separated to create a gap G2 wider than that allowed by the parallel sidewalls of a conventional pleat. More specifically, each first pleat 110 with its substantially R-shaped cross-section enhances the flexibility of the flexible hose 100 beyond that of a conventional flexible hose.

Each first pleat 110 has an entering portion 111 and a head portion 113. The entering portion 111 extends from the inner passage 104 through the hose body 101 to the head portion 113 at an incline with respect to the outer circumferential surface 102 of the hose body 101. The head portion 113 extends from the entering portion 111 substantially vertical with respect to the outer circumferential surface 102 of the hose body 101. Therefore, the head portion 113 of the first pleat 110 is in fluid communication with the inner passage 104 of the hose body 101 via the entering portion 111. Additionally, as illustrated in FIG. 4, the entering portion 111 may be inclined in a direction opposite to the direction in which air flows inside the hose body 101 (arrow A). Then, when some fluid flows (arrow C) in a direction opposite to the direction air mainly flows inside the hose body 101 (arrow A), that air can enter the head portion 113 of the first pleat 110 via the entering portion 111, thereby minimizing the quantity of air entering the head portion 113 of the first pleat 110. As a result, noise generated when fluid flows through the flexible hose 100 may be minimized.

Figure 6:
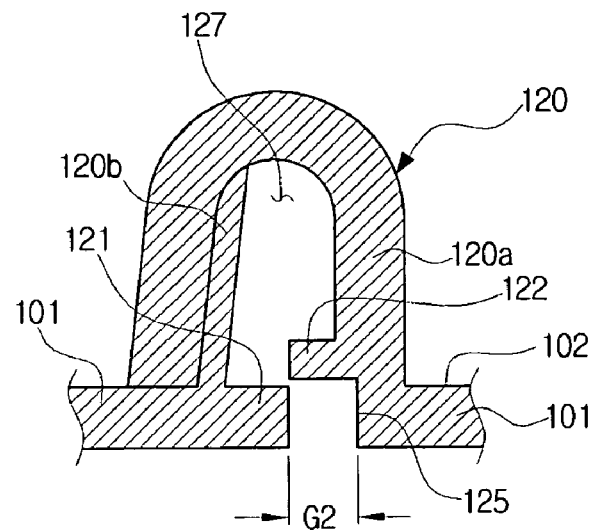
FIG. 6 is a partial sectional view illustrating a second pleat of the flexible hose illustrated in FIG. 4, showing the flexible hose expanded in a lengthwise direction.

Referring to FIGS. 4 and 6, each second pleat 120 may include a first protrusion 121 formed parallel to the outer circumferential surface 102 of the hose body 101 on one sidewall 120b of each of the second pleats 120, and a second protrusion 122 formed above the first protrusion 121 on an opposite sidewall 120a of the second pleat 120; wherein the second protrusion 122 is to be in sliding contact with the first protrusion 121. As a result, when the flexible hose 100 is expanded in the lengthwise direction thereof, the first and second protrusions 121 and 122 move with respect to each other to allow an inner space 127 of the second pleat 120 to be opened or closed with respect to the inside of the hose body 101. When the flexible hose 100 is not in an expanded state, the first and second protrusions 121 and 122 may be formed to block the inner space 127 of the second pleat 120 from fluidly communicating with the inside of the hose body 101.

The flexible hose 100 having the above structure may be made of a resin with flexibility so that when the flexible hose 100 is pulled or pushed respectively in the lengthwise direction thereof, the flexible hose 100 expands or contracts. More specifically, when the flexible hose 100 is pushed in the lengthwise direction thereof, the hose body 101 is compressed lengthwise and the first gaps G1 of the first pleats 110 and the second gaps G2 of the second pleats 120, illustrated in FIGS. 4 and 6, close. When the first gaps G1 of the first pleats 110 are closed, the entering portion 111 closes and air flowing in the inner passage 104 of the hose body 101 cannot enter the head portions 113 of the first pleats 110. Also, when the second gaps G2 of the second pleats 120 are closed, the front ends of the first protrusions 121 of the second pleats 120 contact the lower surfaces 125 of the opposite sidewalls 120a of the second pleats 120. As a result, the length of the flexible hose 100 can be contracted maximally as much as the sum of first gaps G1 of the entering portions 111 of the first pleats 110 and second gaps G2 between the first protrusions 121 and the lower surface 125 of the opposite sidewalls 120a of the second pleats 120. With both first gaps G1 and second gaps G2 closed, air cannot enter the head portions 113 of the first pleats 110 or the inner spaces 127 of the second pleats 120, thereby minimizing noise generated by air flowing inside the flexible hose 100.

Additionally, when the flexible hose 100 is pulled in the lengthwise direction thereof, the hose body 101 is expanded lengthwise and the first gaps G1 of the first pleats 110 and the second gaps G2 of the second pleats 120 open. When the first gaps G1 of the first pleats 110 are opened, the entering portion 111 opens and air flowing inside the hose body 101 can enter the head portions 113 of the first pleats 110. But, when the second gaps G2 of the second pleats 120 are opened, the first and second protrusions 121 and 122 of the second pleats 120 prevent fluid from entering the inner spaces 127 of the second pleats 120, thereby minimizing noise generated by air flowing inside the flexible hose 100 even when the flexible hose 100 is expanded. Accordingly, when the flexible hose 100 is pulled in the lengthwise direction thereof, the length of the flexible hose 100 can be expanded as much as the first gaps G1 of the first pleats 110 and the second gaps G2 of the second pleats 120 open. As a result of the enhanced flexibility of the first pleats 110 and the overlap of first and second protrusions 121 and 122 of the second pleats 120 preventing air from entering the inner spaces 127 of the second pleats 120, the flexible hose 100 having the plurality of first pleats 110 and second pleats 120 increases the flexibility while minimizing the noise compared to the conventional flexible hose.

Additionally, the entering portion 111 of the first pleat 110 may be formed to be inclined in a direction opposite to the direction air flows through the flexible hose 100 (arrow A) so that noise can be minimized further.

Figure 7:
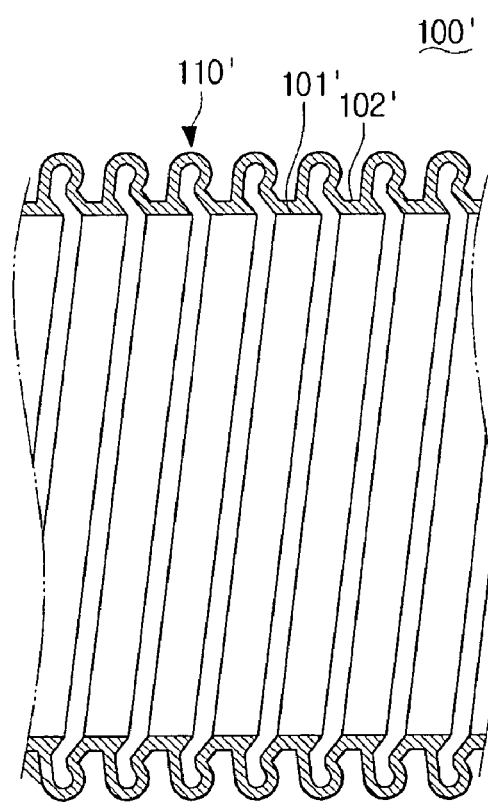
FIG. 7 is a partial longitudinal view in section illustrating a flexible hose according to another embodiment of the present invention.

FIG. 7 is a partial sectional view illustrating a flexible hose 100' according to another embodiment of the present invention.

Referring to FIG. 7, the flexible hose 100' includes a hose body 101' and a plurality of pleats 110'; wherein the plurality of pleats 110' are formed in a substantially helical shape on the outer circumferential surface 102' of the hose body 101' and has the same section as that of the first pleat 110 of the above-described embodiment. More specifically, the flexible hose 100' according to this embodiment is substantially the same as the flexible hose 100 according to the above-described embodiment, except that the plurality of pleats 110' are formed to have the same cross-sections. Therefore, structure and operation of the flexible hose 100' according to this embodiment will be omitted.

According to embodiments of the present invention in the above descriptions and as illustrated in FIG. 3, flexible hose 100 and 100' respectively have a plurality of pleats 110, 120 and 110' formed in a substantially helical shape so that each of the plurality of pleats 110, 120 and 110' is continuously connected as one across the length of the flexible hose 100 and 100'.

Alternatively, FIG. 8 illustrates a flexible hose 200 according to another embodiment of the present invention that may have a hose body 201 with a plurality of pleats 203 that are individually formed substantially in a ring shape on the hose body 201 such that each pleat is separated from each other pleat duplicately across the length of the hose body 201. In this embodiment, the hose body 201 and the plurality of pleats 203 of the flexible hose 200 are substantially similar to the hose body 101 and the plurality of pleats 103 of the flexible hose 100 according to the above-described embodiment. Therefore, detailed descriptions of this embodiment will be omitted.

Figure 9:
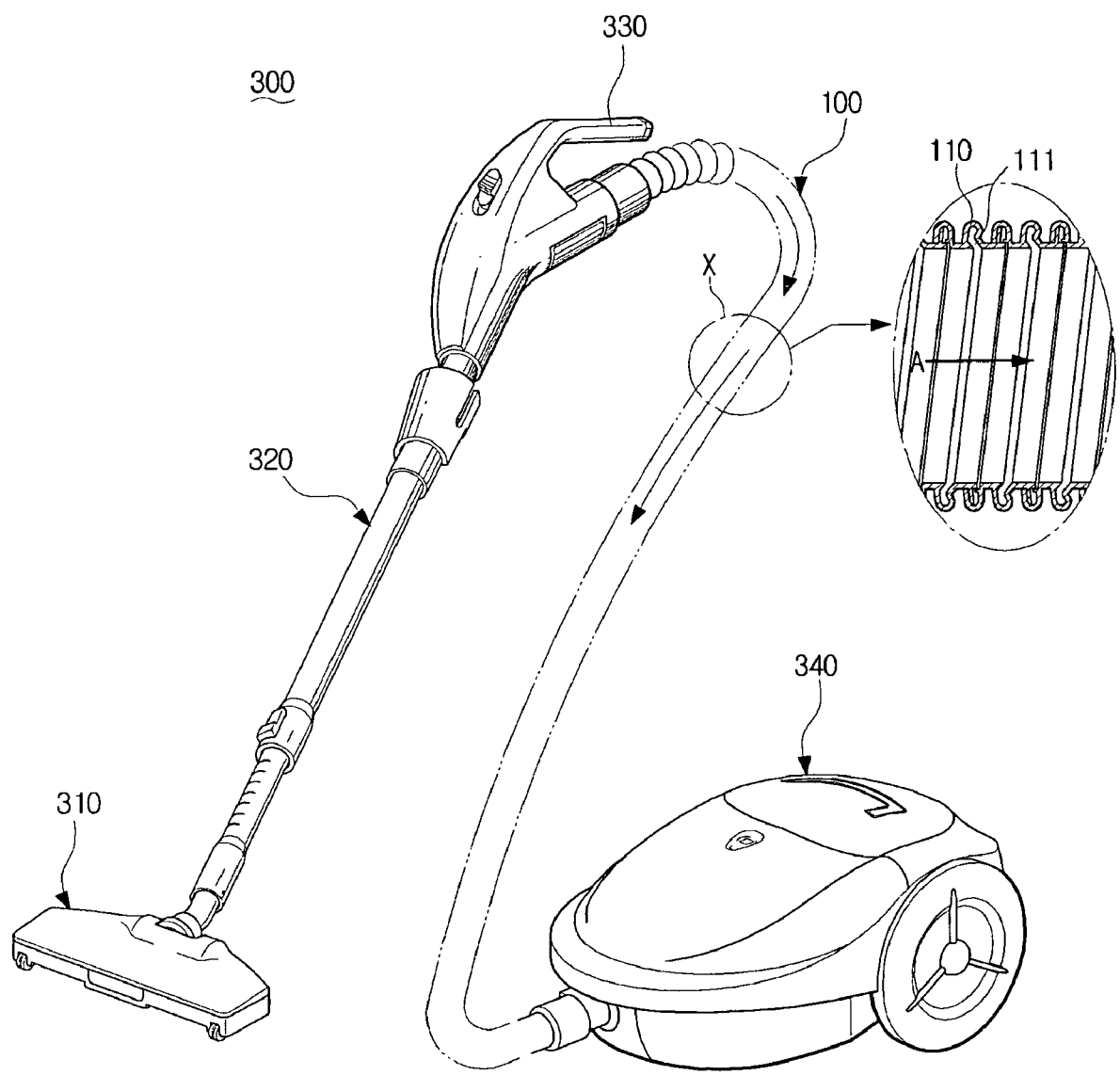
FIG. 9 is a perspective view illustrating a vacuum cleaner having a flexible hose according to an embodiment of the present invention.

FIG. 9 is a perspective view illustrating a vacuum cleaner 300 having the flexible hose 100 according to an embodiment of the present invention. Referring to FIG. 9, the vacuum cleaner 300 having the flexible hose 100 according to an embodiment of the present invention includes a suction nozzle 310, an extension pipe 320, the flexible hose 100, and a cleaner body 340. The suction nozzle 310 has a contaminants suction opening (not illustrated) that faces a surface to be cleaned and draws in contaminants with air from the surface to be cleaned.

The extension pipe 320 is connected with one side of the suction nozzle 310 to allow the contaminants and air drawn-in through the contaminants suction opening of the suction nozzle 310 to move toward the cleaner body 340. A handle 330 is provided at one end of the extension pipe 320 so that a user can grip the handle 330. The flexible hose 100 is disposed between the extension pipe 320 and the cleaner body 340 to allow the contaminants and air having passed through the extension pipe 320 to move toward the cleaner body 340.

In this embodiment, it is important that the flexible hose 100 is connected to the cleaner body 340 such that the entering portion 111 of the first pleat 110 of the flexible hose 100 is inclined to a direction opposite to the direction in which the air with contaminants flows through the flexible hose 100. More specifically, it is preferable that the flexible hose 100 is disposed between the extension pipe 320 and the cleaner body 340 so that the entering portion 111 of the first pleat 110 is inclined in a direction opposite to the direction fluid flows as arrow A through the flexible hose 100 as illustrated in an enlarged view of circle X in FIG. 9. When the entering portion 111 of the first pleat 110 of the flexible hose 100 is formed in a direction opposite to the flowing direction of the fluid, more specifically, the direction contaminants-laden air is being suctioned in, the noise generated by the air passing through the flexible hose 100 can be minimized.

The cleaner body 340 includes a contaminant collecting apparatus (not illustrated) that separates contaminants from the air and collects the separated contaminants, and a vacuum generator (not illustrated) to generate a suction force for drawing in the contaminants with air.

Figure 1:
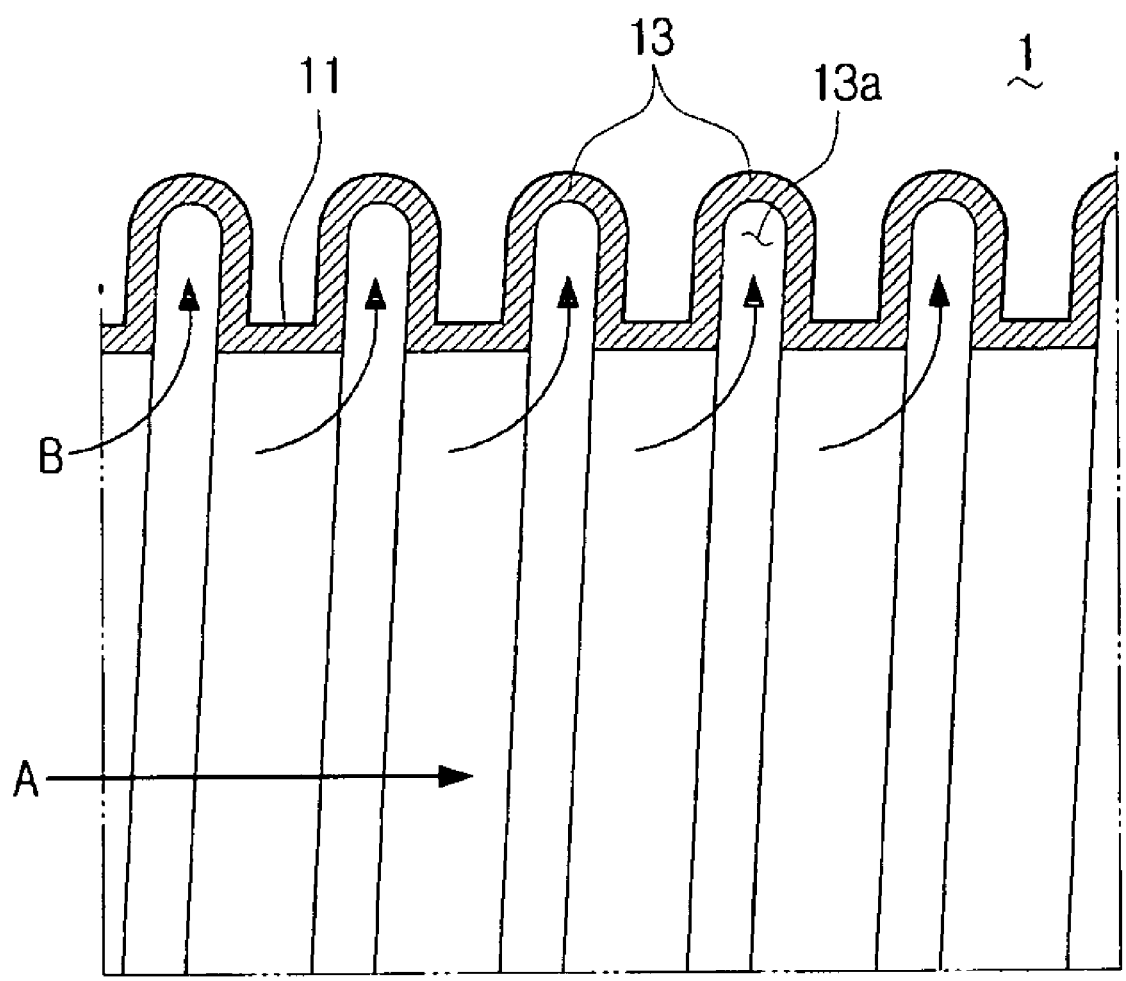
FIG. 1 is a partial longitudinal view in section illustrating a typical embodiment of a prior art flexible hose.
Figure 2:
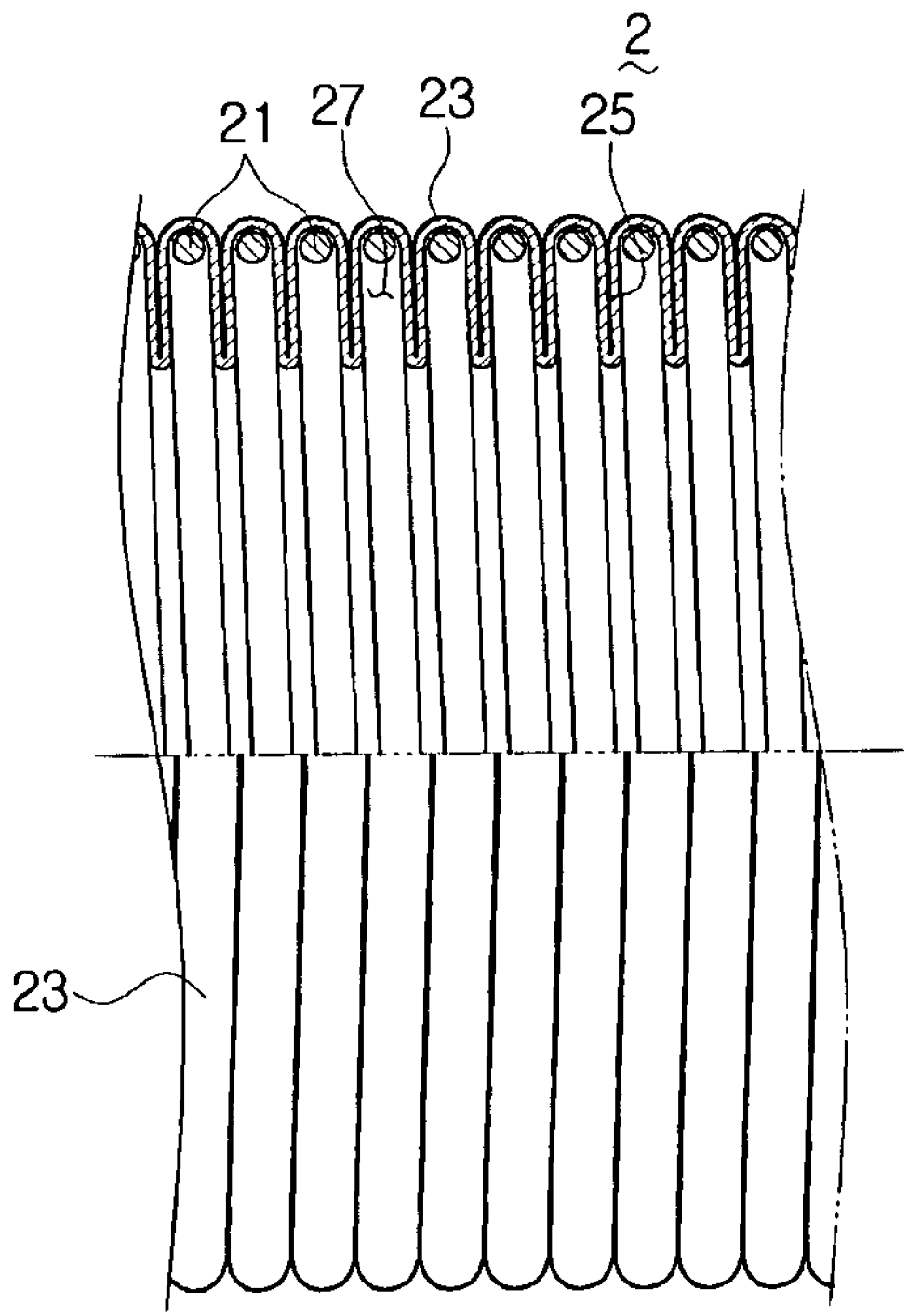
FIG. 2 is a partial longitudinal view in part section and part elevation illustrating a second typical embodiment of prior art flexible hose.

When the vacuum generator of the cleaner body 340 operates to generate a suction force, the contaminants suction opening of the suction nozzle 310 draws in contaminants from the surface to be cleaned. The drawn-in contaminants move to the contaminant collecting apparatus of the cleaner body 340 through the extension pipe 320 and the flexible hose 100. At this time, since the first pleat 110 of the flexible hose 100 has the entering portion 111 that is inclined to a direction opposite to the flowing direction of the air passing through the flexible hose 100, the noise generated by the air passing through the flexible hose 100 is minimized. In the vacuum cleaner using the conventional flexible hose 1 as illustrated in FIG. 1, the noise generated by the air passing through the flexible hose 1 is approximately 69.4 dB. But, in the vacuum cleaner 300 using the flexible hose 100 according to an embodiment of the present invention, the noise generated in the flexible hose 100 by the air is approximately 68.9 dB. As a result, the noise generated in the vacuum cleaner 300 is reduced by approximately 0.5 dB.

The contaminant collecting apparatus separates contaminants from the drawn-in air, collects the separated contaminants, and then discharges cleaned air. The air discharged from the contaminant collecting apparatus passes through the vacuum generator, and then is exhausted to the outside of the cleaner body 340.

In the above description, the vacuum cleaner 300 is used merely as an example of one apparatus that can use the flexible hose 100 according to an embodiment of the present invention. However, this does not limit the kind of the apparatuses capable of using the flexible hose 100 according to an embodiment of the present invention.

Because the flexible hose according to an embodiment of the present invention can prevent a fluid from entering the inner spaces of the plurality of pleats, the noise generated by the fluid passing through the flexible hose may be minimized.

Furthermore, the flexible hose according to an embodiment of the present invention has the plurality of pleats, one sidewall of each of which is bent toward the inside of the pleat, enhances flexibility over a prior art flexible hose having a plurality of pleats, both sidewalls of each of which are formed parallel to each other.

As a result, with a vacuum cleaner having a flexible hose according to an embodiment of the present invention, noise generated by air passing through the flexible hose may be minimized and the flexibility of the hose may be enhanced so that a user can control the suction nozzle of the vacuum cleaner more easily.

While the embodiments of the present invention have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. A flexible hose, comprising:
   a hose body having an inner passageway and an outer circumferential surface with a substantially uniform diameter; and
   a plurality of pleats formed on the outer circumferential surface of the hose body in predetermined intervals and adapted to give flexibility to and reduce noise within the flexible hose, wherein at least one of the plurality of pleats comprises:
      an entering portion inclined with respect to the outer circumferential surface of the hose body, the entering portion being in fluid communication with the inner passageway of the hose body when in an open position, and the entering portion being in the open position when the hose body is expanded lengthwise and in a closed position when the hose body is compressed lengthwise, and
      a pair of sidewalls extending substantially vertical to the outer circumferential surface of the hose body, and a head portion formed between the pair of sidewalls, the head portion being in fluid communication with the inner passageway of the hose body via the entering portion when the entering portion is in the open position and the head portion not being in fluid communication with the inner passageway of the hose body when the entering portion is in the closed position.

2. The flexible hose of claim 1, wherein
   a sidewall of each of the plurality of pleats is bent toward an inside of the pleat.

3. The flexible hose of claim 1, wherein
   each of the plurality of pleats is a separate ring around the outer circumferential surface of the hose body.

4. The flexible hose of claim 1, wherein
   the plurality of pleats is at least one pleat continuously connected across the length of the outer circumferential surface of the hose body in a substantially helical shape.

5. The flexible hose of claim 1, wherein at least one of the plurality of pleats comprises:
   a pair of sidewalls extending substantially vertical to the outer circumferential surface of the hose body, and an inner space formed between the pair of sidewalls,
   a first protrusion formed on one of the sidewalls, extending substantially parallel to the outer circumferential surface of the hose body, and
   a second protrusion formed on the opposite sidewall, configured to be in sliding contact with the first protrusion such that when the first protrusion and second protrusion are in sliding contact the inner space is not in fluid communication with the inner passageway.

6. The flexible hose of claim 1, wherein
   at least two of the plurality of pleats have different cross-sectional shapes.

7. A flexible hose, comprising:
   a hose body having an inner passageway and an outer circumferential surface; and
   a plurality of pleats formed on the outer circumferential surface of the hose body in predetermined intervals and adapted to reduce noise within the flexible hose, wherein
   at least one first pleat of the plurality of pleats comprises:
      a pair of sidewalls extending substantially vertical to the outer circumferential surface of the hose body, and an inner space formed between the pair of sidewalls,
      a first protrusion formed on one sidewall of the at least one first pleat, extending substantially parallel to the outer circumferential surface of the hose body, and
      a second protrusion formed on an opposite sidewall of the at least one first pleat, configured to be in sliding contact with the first protrusion such that when the first protrusion and second protrusion are in sliding contact the inner space is not in fluid communication with the inner passageway, and
   at least one second pleat of the plurality of pleats comprises:
      an entering portion inclined with respect to the outer circumferential surface of the hose body, the entering portion being in fluid communication with the inner passageway of the hose body when in an open position, and the entering portion being in the open position when the hose body is expanded lengthwise and in a closed position when the hose body is compressed lengthwise, and
      a pair of sidewalls extending substantially vertical to the outer circumferential surface of the hose body, and a head portion formed between the pair of sidewalls, the head portion being in fluid communication with the inner passageway of the hose body via the entering portion when the entering portion is in the open position and the head portion not being in fluid communication with the inner passageway of the hose body when the entering portion is in the closed position.

8. The flexible hose of claim 7, wherein
   each of the plurality of pleats is a separate ring around the outer circumferential surface of the hose body.

9. The flexible hose of claim 7, wherein
   the at least one first pleat is continuously connected across the length of the outer circumferential surface of the hose body in a substantially helical shape.

10. The flexible hose of claim 9, wherein the at least one second pleat is continuously connected across the length of the outer circumferential surface of the hose body in a substantially helical shape.

11. A vacuum cleaner, comprising:
a cleaner body; and
a flexible hose connected to the cleaner body, wherein the flexible hose comprises:
  a hose body having an inner passageway and an outer circumferential surface with a substantially uniform diameter; and
  a plurality of pleats formed on an outer circumferential surface of the hose body in predetermined intervals and adapted to give flexibility to and reduce noise within the hose body,
  wherein at least one of the plurality of pleats comprises:
    an entering portion inclined with respect to the outer circumferential surface of the hose body, the entering portion being in fluid communication with the inner passageway of the hose body when in an open position, and the entering portion being in the open position when the hose body is expanded lengthwise and in a closed position when the hose body is compressed lengthwise, and
    a pair of sidewalls extending substantially vertical to the outer circumferential surface of the hose body, and a head portion formed between the pair of sidewalls, the head portion being in fluid communication with the inner passageway of the hose body via the entering portion when the entering portion is in the open position and the head portion not being in fluid communication with the inner passageway of the hose body when the entering portion is in the closed position.

12. The vacuum cleaner of claim 11, wherein
a sidewall of each of the plurality of pleats is bent toward an inside of the pleat.

13. The vacuum cleaner of claim 11, wherein
each of the plurality of pleats is a separate ring around the outer circumferential surface of the hose body.

14. The vacuum cleaner of claim 11, wherein
the plurality of pleats is at least one pleat continuously connected across the length of the outer circumferential surface of the hose body in a substantially helical shape.

15. The vacuum cleaner of claim 11, wherein
at least two of the plurality of pleats have different cross-sectional shapes.

16. The vacuum cleaner of claim 11, wherein
the cleaner body suctions air towards the cleaner body and the flexible hose is formed so that the entering portion of each of the plurality of pleats is inclined opposite to the direction air is suctioned into the cleaner body.

17. The vacuum cleaner of claim 11, wherein at least one of the plurality of pleats comprises:
  a pair of sidewalls extending substantially vertical to the outer circumferential surface of the hose body, and an inner space formed between the pair of sidewalls,
  a first protrusion formed on one of the sidewalls, extending substantially parallel to the outer circumferential surface of the hose body, and
  a second protrusion formed on the opposite sidewall, configured to be in sliding contact with the first protrusion such that when the first protrusion and second protrusion are in sliding contact the inner space is not in fluid communication with the inner passageway.

18. A vacuum cleaner, comprising:
a cleaner body; and
a flexible hose connected to the cleaner body, wherein the flexible hose comprises:
  a hose body having an inner passageway and an outer circumferential surface; and
  a plurality of pleats formed on the outer circumferential surface of the hose body to reduce noise within the hose body, wherein
  at least one first pleat of the plurality of pleats comprises:
    a pair of sidewalls extending substantially vertical to the outer circumferential surface of the hose body, and an inner space formed between the pair of sidewalls,
    a first protrusion formed on one of the sidewalls of the at least one first pleat, extending substantially parallel to the outer circumferential surface of the hose body, and
    a second protrusion formed on the opposite sidewall of the at least one first pleat, configured to be in sliding contact with the first protrusion such that when the first protrusion and second protrusion are in sliding contact the inner space is not in fluid communication with the inner passageway, and
  at least one second pleat of the plurality of pleats comprises:
    an entering portion inclined with respect to the outer circumferential surface of the hose body, the entering portion being in fluid communication with the inner passageway of the hose body when in an open position, and the entering portion being in the open position when the hose body is expanded lengthwise and in a closed position when the hose body is compressed lengthwise, and
    a pair of sidewalls extending substantially vertical to the outer circumferential surface of the hose body, and a head portion formed between the pair of sidewalls, the head portion being in fluid communication with the inner passageway of the hose body via the entering portion when the entering portion is in the open position and the head portion not being in fluid communication with the inner passageway of the hose body when the entering portion is in the closed position.

19. The vacuum cleaner of claim 18, wherein
each of the plurality of pleats is a separate ring around the outer circumferential surface of the hose body.

20. The vacuum cleaner of claim 18, wherein
the at least one first pleat continuously connected across the length of the outer circumferential surface of the hose body in a substantially helical shape.

21. The vacuum cleaner of claim 20, wherein
the at least one second pleat is continuously connected across the length of the outer circumferential surface of the hose body in a substantially helical shape.

* * * * *